May 31, 1966  T. M. McCAW  3,253,483
DIFFERENTIAL
Filed March 6, 1963  3 Sheets-Sheet 2

INVENTOR.
THOMAS M. MCCAW
BY
Woodling, Krost, Granger & Krost
Att'ys

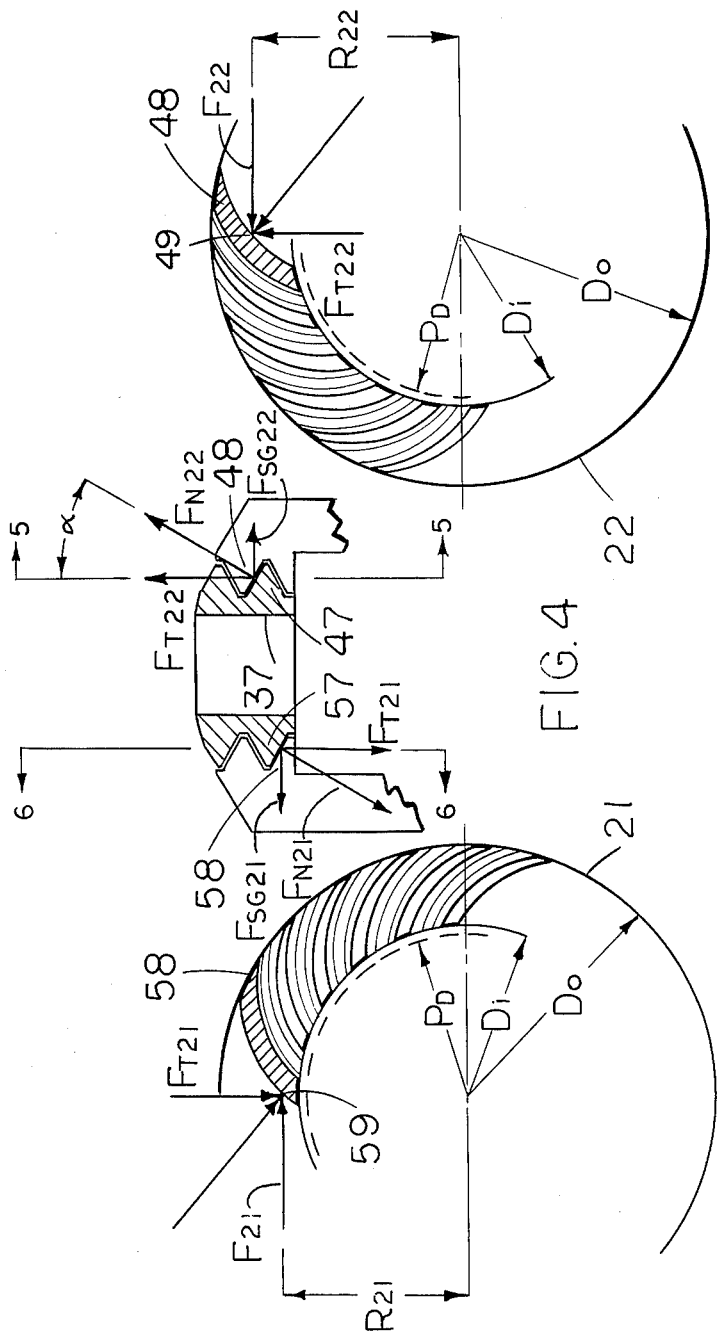

United States Patent Office 3,253,483
Patented May 31, 1966

3,253,483
DIFFERENTIAL
Thomas M. McCaw, 2113 S. 7th St., Lafayette, Ind.
Filed Mar. 6, 1963, Ser. No. 263,218
8 Claims. (Cl. 74—711)

The present invention relates in general to differentials and more particularly to a type of differential wherein it is conveniently possible to design a wide range of semi-locking and self-locking differentials. The present disclosure might more appropriately be referred to as a torque proportioning differential.

An object of the invention is to provide a differential which utilizes helical face gears with cooperating helical pinions which gears lend themselves to a comparatively accurate calculation of inefficiency in the action of the gears with a corresponding inefficiency of differential action and resultant locking effect on the differential.

Another object of the present invention is to provide a helical face gear differential wherein the efficiency can be modified by the pressure angle between the teeth.

Another object of the present invention is to provide a helical face gear differential which produces a torque difference between the side gears because of contact between the teeth on opposite sides of a pinion with different sides of a corresponding helical tooth on the respective helical face gears.

Another object of the present invention is to provide a locking type differential which utilizes helical pinions meshing with helical face side gears wherein the pinion teeth in practice preferably operate outside the theoretical pitch diameter of the face gears, however, it is physically possible to make a device wherein the theoretical pitch diameter of the helical face gear does fall within the physical engagement of the helical pinions and the helical face side gears.

Another object of the present invention is to provide a locking type differential wherein at least a portion of the locking effect is established because of the helix angle and pressure angle of engagement between the helical pinions and the helical face side gears.

Another object of the present invention is to provide a locking type differential which utilizes helical face side gears which makes possible the design of such a differential that will fit in a conventional beveled gear differential case or housing and which will have a comparable torque capacity. In other words, the helical pinions and helical face side gears of the present invention can be substituted for the bevel pinions and bevel side gears used in existing conventional differentials.

Other objects and a fuller understanding of this invention may be had by referring to the following description and claims, taken in conjunction with the accompanying drawings, in which:

FIGURE 4 is a diagrammatic representation showing the engagement between the respective helical side gears and a helical pinion;

FIGURE 5 is also a diagrammatic representation of a helical face side gear which view would be taken generally along the line 5—5 of FIGURE 4; and FIGURE 6 is a similar diagrammatic representation, however, showing the side gear on the left and taken generally along the line 6—6 of FIGURE 4.

Figure 1:
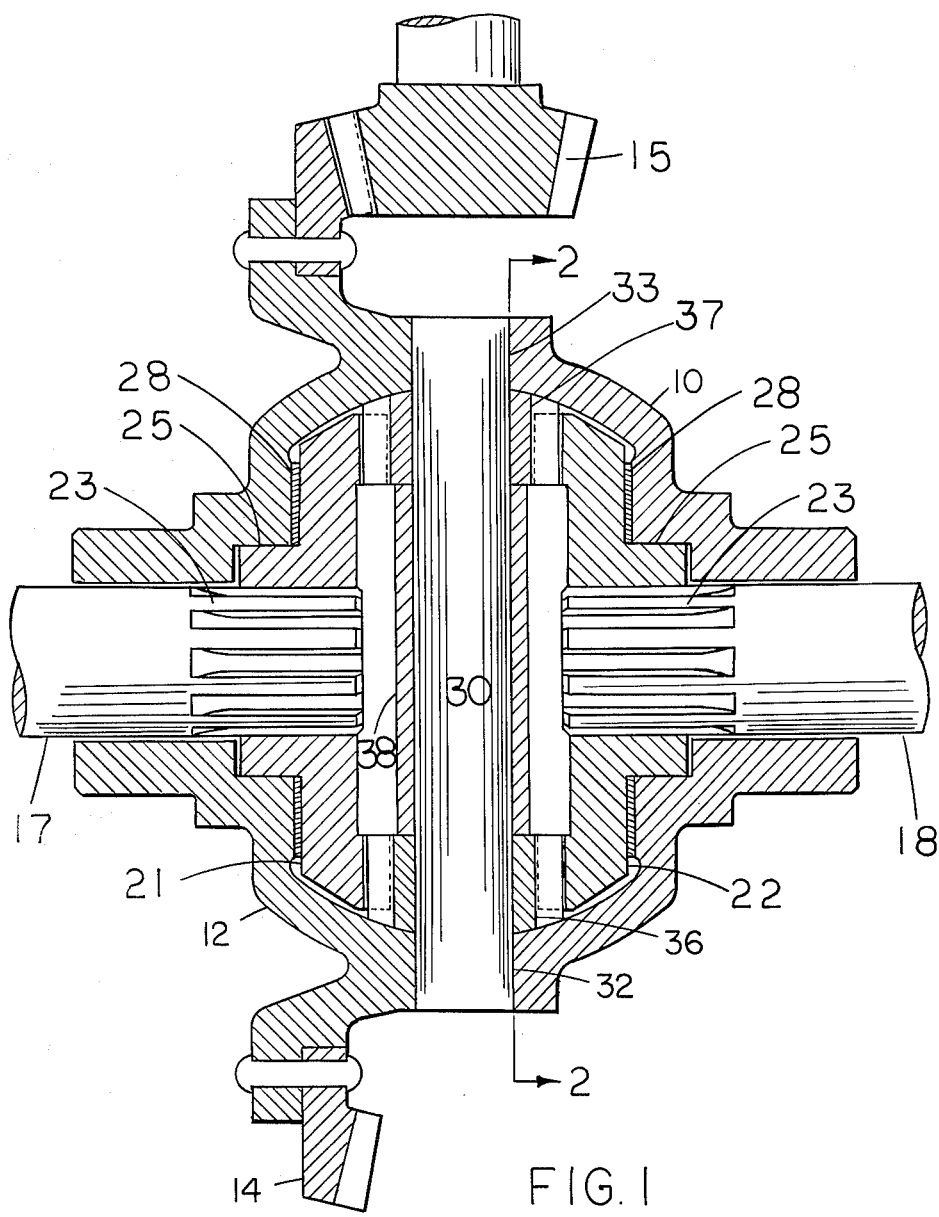
FIGURE 1 is a sectional view of a locking type differential as constructed in accordance with the teachings of the present invention.
Figure 2:
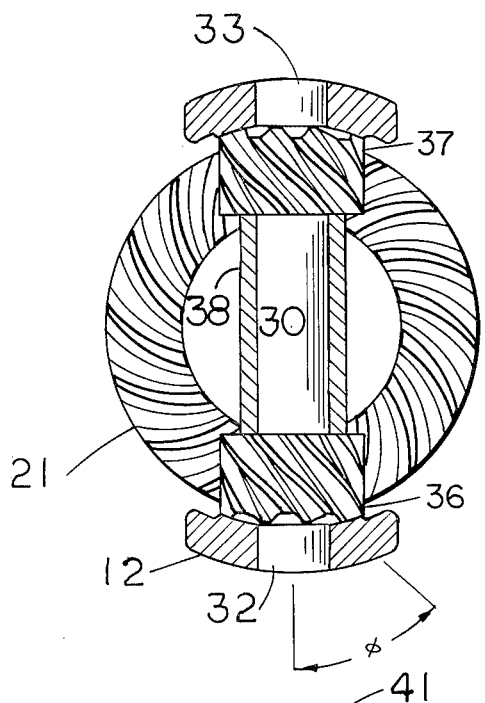
FIGURE 2 is a view taken generally along the line 2—2 of FIGURE 1 and showing a differential which utilizes two helical pinions in combination with helical face side gears.

Referring specifically to FIGURES 1 and 2 of the drawings, these figures illustrate the structural features of the present design. The locking type differential which has been shown is indicated generally by the reference numeral 10 and the design shown in FIGURES 1 and 2 is preferably for lighter type applications such as automobile use. The differential shown here includes a housing or case 12 and secured to the outer portion of the case in a conventional manner is a ring gear 14 in meshing engagement with a drive pinion 15 which extends from a conventional source of power. First and second axles 17 and 18 extend into the case 12 through openings on opposed sides thereof and these axles 17 and 18 are located coaxial with each other in a conventional manner. First and second helical face side gears 21 and 22 are located in the case coaxially with the first and second axles 17 and 18 respectively. The side gears 21 and 22 are connected to the respective axles 17 and 18 by a splined connection indicated at 23 and each of the side gears has a portion 25 located in a recess in the housing which provides a bearing for the side gears. A thrust washer 28 is located between the back of each side gear and the adjacent portion of the case 12. The side gears are coaxial with the axles.

A pinion shaft 30 is provided and has opposite end portions 32 and 33 secured to the case 12 and the axis of the pinion shaft extends generally normal to the axis of the side gears and axles. First and second helical pinions 36 and 37 are rotatively mounted on opposed ends of the pinion shaft 30 and a spacer 38 is located between the pinions 36 and 37 to maintain them in their respective axial locations. The axis of rotation of the helical pinions 36 and 37 coincides with the axis of the pinion shaft and this common axis intersects or crosses the axis of the side gears and the axles.

Figure 3:
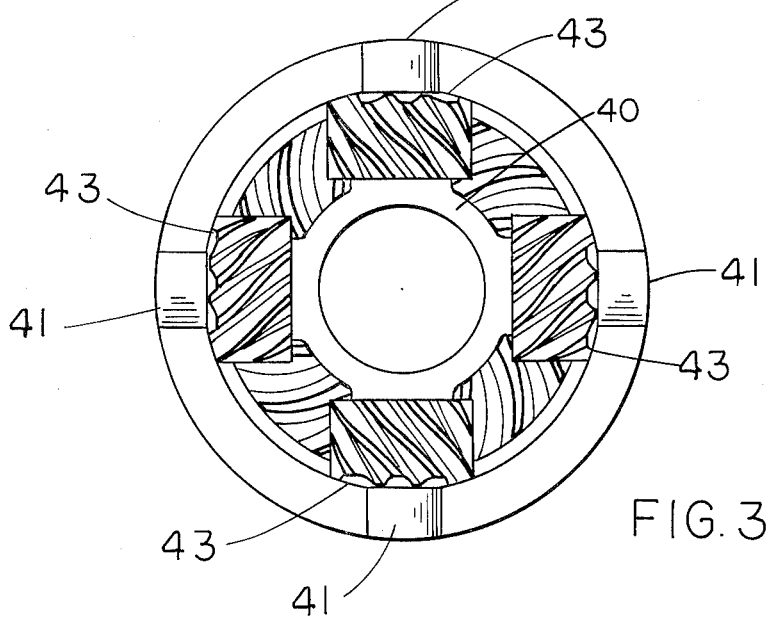
FIGURE 3 is a view similar to FIGURE 2, however, showing a modification wherein four helical pinions are used.

FIGURE 3 illustrates a modification in the means for physically mounting the pinions in the differential. FIGURE 3 illustrates what is commonly referred to as a spider 40 which has four arms 41 thereon located 90 degrees apart. The spider 40 accomplishes basically the same fuction as the pinion shaft 30 and spacer 38 in the embodiment of FIGURES 1 and 2. As indicated in FIGURE 3, each of the four arms 41 serves to rotatively mount a helical pinion 43 which in turn cooperates with first and second side gears as shown in FIGURE 1.

The design of FIGURES 1 and 2 is preferably used in applications having low torque requirements, as for example in automotive use, whereas the design shown in FIGURE 3 is utilized in heavier applications, for example trucks and off-the-road type equipment.

The first and second helical pinions 36 and 37 which have been illustrated in FIGURES 1 and 2 are of the same construction as the helical pinions shown in FIGURE 3 and these pinions have a helix angle which corresponds to and interfits the helix angle of the side gears 21 and 22. It has been found that the preferable range of helix angle for the use in the present invention is in the range of from 25° to 80°. It is, however, possible to design a differential in accordance with the teachings of the present invention to fall outside this range, however, preferred results occur within this particular range recited.

The overall theme which underlies the structure, operation and result of the present differential is the ability to interchange the helical face side gears and meshing pinions with the conventional bevel type gears and pinions (which are quite efficient and have little or no locking effect) and by varying the helix angle of the side gears and meshing pinions to come up with a very wide range of differential efficiencies. The overall effect is that if the differentiating action is made very inefficient, then the tendency of the differential to lock and both axles turn as a unit is very great, whereas if the other extreme is utilized, namely the differentiating action is made quite efficient, then there is very little tendency for both axles to turn as a unit. As a matter of example only, in automobile applications an efficiency of about 20% might be preferable, whereas in earthmoving machinery applications an efficiency of about 50% might be more desirable.

The general equation of a differential is shown in the relationships given below:

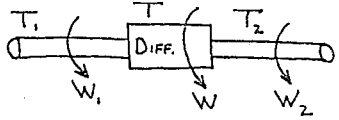

$T$ = Torque into differential case
$T_1$ = Torque shaft 1
$T_2$ = Torque shaft 2
$W$ = Angular velocity into differential case
$W_1$ = Angular velocity shaft No. 1
$W_2$ = Angular velocity shaft No. 2

$$T = T_1 + T_2 \qquad \text{(Equation 1)}$$

$$W = \frac{W_1 + W_2}{2} \qquad \text{(Equation 2)}$$

If
$W = 0$ (i.e., differential case held) and $T = 0$
Then
$W_1 = -W_2$ and $T_1 = -T_2$ The differential can be treated as a $1 = -1$ gear box. Since the gear box has some loss, the torque out will be less than the input torque. The efficiency can be expressed as—

$$E = \frac{T_1}{T_2} \text{ If } W_1 > W_2 \text{ or } E = \frac{T_2}{T_1} \text{ If } W_2 > W_1$$

(Equation 3)

Assume that $T_1$ is applied to a slipping wheel and $W_1 > W_2$. The driving torque $T_d$ will be equal to $T$ which when combining Equations 1 and 3 gives:

$$T_d = T_{slip}\left(1 + \frac{1}{E}\right)$$

Most bevel gear differentials are very efficient and the driving torque is rarely more than twice the torque in the slipping wheel. If the efficiency of the differential is made quite low, as for example 25%, then the driving torque will be five times the torque in the slipping wheel. An inefficient differential is therefore a semilocking differential and therefore the term torque proportioning differential is in many instances a better term. The equation for the efficiency of the helical face side gear differential of the present invention is as follows:

$$E = \left[1 - K_f\left(\frac{\tan \alpha}{\cos \phi} + \frac{1}{\cos \alpha \cos \phi}\right)\right]^2 \pm E_v$$

where:

$K_f$ = Coefficient of friction
$\alpha$ = Pressure angle
$\phi$ = Helix angle $E_v$ = Variable efficiency = $\dfrac{t \sin \phi}{D_{avg.}}$ $t$ = Normal tooth thickness $$D_{avg.} = \frac{D_o + D_i}{2}$$

In the helical face side gear differential, the locking effect is determined by:

(1) A variable torque applied to the side gears caused by opposed side gear teeth contacting opposite sides of the helical pinion teeth.

(2) Friction between the backs of the side gears and the differential case.

(3) Friction in the gear teeth.

Reference is made at the present time to FIGURES 4, 5 and 6 in order to describe the theory of operation of applicant's device and the successful results achieved thereby. Applicant does not wish, however, to be strictly held to the theory of operation of the device since it will be readily appreciated that the structure as disclosed and claimed herein is the major consideration. Torque which is transmitted or applied to the differential housing or case through the inter-engagement of the ring gear 14 and drive pinion 15 is transmitted through the pinion shaft 30, in the case of FIGURES 1 and 2 and the spider 40 in the case of FIGURE 3, and the helical pinions to the side gears. Assuming no rotation of the pinions about their respective axes, then all of this torque is applied by the inter-engagement of the pinion teeth with the side gear teeth which tends to rotate the case about the axes of the side gears which rotates the wheels of the vehicle. It will be seen in referring to FIGURES 4, 5 and 6 that this torque as above described is transmitted by means of the engagement of tooth 47 on the helical pinion 37 with the helical tooth 48 on the side gear at a position indicated by the reference numeral 49. This engagement therefore is on the concave side of the helical tooth 48 on the side gear 22. At the same time a tooth 57 on the other side of the pinion 37 is engaging a tooth 58 on the side gear 21. As seen in FIGURE 6, the helical teeth on the side gear 21 extend in a direction which, for the purpose of this discussion, we might call opposite, or in other words, if the two side gears were brought together, the teeth on the two side gears would cross each other. As a result, the tooth 57 engages the tooth 58 at a position 59 which may be referred to as being on the convex side of the tooth 58. Although the engagement has been described as at a position, it should be understood that this is an area contact and the use of a point or a position has been resorted to merely for a clarification in the understanding of how the device operates.

As a result, the forces applied to the side gears through the medium of the engagement of the pinion teeth with the side gear teeth are equal, however, since the distance from the center line of the side gears to the engagement positions indicated in FIGURES 5 and 6 as distances $R_{22}$ and $R_{21}$ are not equal, then the torque applied to the side gears are not equal. As the helical pinion rotates in its differential action, it will be seen that the distances $R_{22}$ and $R_{21}$ vary, thus producing what may be referred to as a variable torque to each of the side gears. Relating this information back to the efficiency equation for the helical face differential of the present invention, this variation occurs in that part of the equation of $E_v$. It will be seen as this varies through the range from a high to a low value so will E, and when E reaches a low value, then the locking effect is greater at this point in time and as a result the tendency for both wheels of the vehicles to move together.

The helix angle has been indicated in FIGURE 2 by the Greek letter phi and because of this helix angle equal and opposite thrust forces $F_{t21}$ and $F_{t22}$ are produced on the pinion. In other words, the force tending to move the pinion in the direction of its axis because of the inter-engagement of the teeth with the teeth of the side gear 21 on the one hand and the teeth of the side gear 22 on the other hand, is equal and in opposite directions and as a result the force tends to cause the pinion to "float." The tooth pressure angle has been indicated in the efficiency equation for the helical face differential and in the drawing of FIGURE 4 by the Greek letter alpha and this pressure angle produces forces on the side gears $F_{sg21}$ and $F_{sg22}$, and these forces thrust the side gears in the direction of their axes back against the case, specifically in FIGURE 1 in engagement with the thrust washers 28 with such force as to produce a sizable friction loss and resultant loss of efficiency. Forces $F_{sg21}$ and $F_{sg22}$ will increase as the design pressure angle is increased.

As mentioned hereinabove, in the preferred embodiment of the invention, the helical face side gears are designed to operate outside the theoretical pitch diameter thereof and the equation given above for the efficiency of the helical face locking type differential has assumed that the engagement of the pinion and face gear teeth is outside the theoretical pitch diameter of the helical face side gears. This pitch diameter is indicated at $P_d$ in FIGURES 5 and 6. In other words, it is preferred that the engagement of the pinion teeth with the helical teeth on the side gears not coincide with the theoretical pitch diameter. The pitch diameter is conventionally determined by the number of teeth divided by the roll diametral pitch to the helical pinion. This calculation is well known to those skilled in the art.

With a design such as this, there is a certain amount of sliding action between the helical pinion teeth and the helical side gear teeth which gives a sizable friction loss and resultant loss of efficiency.

According to the teachings of the present invention, the definition of a helical face side gear is a face type gear that has conjugate tooth action with a helical pinion, and the definition of the helical pinion is a toothed wheel with teeth inclined to the axis. The number of teeth in the pinion may be as low as one or as high as is practically possible. We wish to have it understood that the helical face side gear is not limited to an involute form but rather may incorporate any other tooth shape known to the art including circular and cycloidal.

The total friction loss is proportional to the normal forces $F_{n21}$ and $F_{n22}$ and for a given value of $F_{21}$ and $F_{22}$ increases with an increase in helix angle and pressure angle. The combined loss of efficiency effects and the variable intermittent torque effects provide a transfer of driving torque away from the slipping wheel. With a practical range of design geometry, the efficiency can be made as low as 10% which when translated, will give a torque transfer of ten itmes the torque in the slipping wheel.

As a matter of example, a test was conducted of a helical face side gear locking type differential in accordance with the teachings of the present invention and using the same type construction on a calculated basis, the results were as follows:

|  | | $E_{min}$ |
|---|---|---|
| Calculated | .62 | .44 |
| Test | .60 | .35 |

Formula parameters:

$K_1 = .10$
$\alpha = 30°$
$\phi = 50°$
$E_v = 9\%$
Number of pinion teeth—8
Number of gear teeth—15 which resulted in the $E_{max}$ of 60% and $E_{min}$ of 35%.

The following are calculations for determining the efficiency of a helical face locking type differential in accordance with the present invention utilizing variable helix angles within the preferred limits as disclosed herein. For a helical type pinion with matching helical face side gears with a 30 degree pressure angle between the teeth and with a helix angle of 25 degrees, an average efficiency of 65% was obtained by the following equation:

$$E = [1 - .10\ (.60 + 1.3)]^2$$
$$[1 - .19]^2 = [.81]^2 = .65$$
$$= 65\%$$

The variable leverage effect is a function of the specific tooth geometry which includes the diametral pitch, the normal tooth thickness, the helix angle and the diameter at the mid face of the helical side gear. In this instance, this variable leverage effect equals 10%, therefore resulting in an $E_{max}$ of 75% and an $E_{min}$ of 55%.

In utilizing the same pressure angle but with a 70 degree helix angle, an average efficiency of 25% was obtained and when considering the variable leverage effect, $E_{max}$ was 35% and $E_{min}$ was 15%.

Maximum variable leverage effect is obtained with even numbers of teeth in both helical pinions and helical face side gears regardless of whether two or four pinions are utilized. Variable leverage effects can be modified by various combinations of even and odd numbers of teeth in the helical pinions and helical side gears within limits. For example, it will be seen that in a design such as shown in FIGURES 1 and 2 of the drawings, that the combination might include an even number of teeth on the pinion and an odd number on the side gear or an odd number on the pinion and even number on the side gear or an even number on both. In the example of the four-pinion differential as shown in FIGURE 3, it is necessary that the side gear number of teeth be divisible by two or four and the number of teeth in the pinions may be even or odd in combination with the number of teeth in the side gears being divisible by either two or four. It will be readily apparent therefore that in the four-pinion design there are many combinations to vary the variable leverage effect. The equation set forth herein for the efficiency of the helical face type self-locking differential of the present invention has been utilized on the basis of the maximum variable torque effect, for example in the two-pinion design which occurs with an even number of teeth in the pinion and an even number of teeth in the side gear.

It will therefore be seen that as pointed out hereinabove in the objects of the present invention, it is conveniently possible to design a wide range of semi-locking and self-locking differentials by utilizing the helical type pinions in combination with the helical face side gears. The type of the locking effect which is desired in the finished commercial device can be comparatively accurately determined by preferably utilizing the helix angles as cited in the range pointed out herein and by considering the other variables such as the pressure angle etc., of the gear teeth as pointed out in detail hereinabove. The locking effect of the differential can be modified by the pressure angle and the variable lever effect results because of the varying lever arm effect of the pinion engagement with respective side gears. The present design which utilizes the helical type gears wherein the axes of the pinions intersect the axes of the side gears enables the present invention to be incorporated into presently existing differential cases or housings which results in a very economical change-over where desired. Applicant has contributed in a crossed axis type differential the use of matching helical pinions and helical face gears preferably but not necessarily in the range specified and the same is true with respect to the pitch diameter.

It should be understood that the calculations and equations as shown above are simplified approximations which give results of sufficient accuracy for average design requirements. Although helical face gears and pinions have been known, they have not come into widespread use because they are somewhat more difficult to produce than straight bevel and spiral bevel gears. The design of face gears and pinions is well covered by industry literature such as "Gear Handbook" by Darle W. Dudley.

However, face gears and pinions designed from the handbook parameters are very efficient and have limited load carrying capacity because of limited length of tooth engagement. The design requirements for the semi-locking and self-locking differentials of high helix angle and tooth engagement outside the theoretical pitch diameter of the face gears make possible length of tooth engagement and load carrying capability comparable to the bevel gears used in conventional differentials. Helical face gears and pinions can be produced by conventional gear production methods such as hobbing, shaping, rolling, milling, forging, casting, etc.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A locking type differential mechanism for a vehicle comprising a housing, a ring gear secured to said housing, first and second axles extending into said housing from respective sides thereof and being coaxial with each other, first and second side gears mounted in said housing on opposite sides thereof and being rotatively connected to said first and second axles respectively, each of said first and second side gears comprising a helical face gear, first and second helical pinions having a helix angle in the range of 25 to 80 degrees and rotatively mounted in said housing on opposite sides thereof and rotatively engaging said first and second side gears respectively, the helix angle of said side gears corresponding to the helix angle of said pinions, the axes of rotation of said pinions being coaxial with each other and intersecting the axes of said axles, each said first and second helical face side gears having a theoretical pitch diameter, the entire engagement of said pinions with said side gears being outside the theoretical pitch diameter of said side gears.

2. A locking type differential mechanism for a vehicle comprising a housing, first and second axles extending into said housing from respective sides thereof and being coaxial with each other, first and second side gears mounted in said housing and being rotatively connected to said first and second axles respectively, each of said first and second side gears comprising a helical face gear, at least first and second helical pinions having a helix angle in the range of 25 to 80 degrees and rotatively mounted in said housing and engaging said first and second side gears respectively, the helix angle of said side gears corresponding to the helix angle of said pinions, the axes of rotation of said pinions being coaxial with each other and intersecting the axes of said axles, each said first and second helical face side gears having a theoretical pitch diameter, the entire engagement of said pinions with said side gears being outside the theoretical pitch diameter of said side gears.

3. A locking type differential mechanism for a vehicle comprising a case, first and second axles extending into said case from respective sides thereof and being coaxial with each other, first and second side gears mounted in said case and being rotatively connected to said first and second axles respectively, each of said first and second side gears comprising a helical face gear, a helical pinion having a helix angle in the range of 25 to 80 degrees and rotatively mounted in said case and engaging said first and second side gears, the helix angle of said side gears corresponding to the helix angle of said pinion, the axis of rotation of said pinion intersecting the axes of said axles, each said first and second helical face side gears having a pitch diameter, the entire engagement of said pinion with said side gears being outside the pitch diameter of said side gears.

4. A locking type differential mechanism for a vehicle comprising a case, first and second side gears mounted in said case coaxial with each other and adapted to be rotatively connected to first and second axles respectively, each of said first and second side gears comprising a helical face gear, a helical pinion rotatively mounted in said case and engaging said first and second side gears, the helix angle of said side gears corresponding to the helix angle of said pinion, the axis of rotation of said pinion intersecting the axes of said side gears.

5. A differential mechanism for a vehicle comprising a case, first and second side gears mounted in said case and adapted to be rotatively connected to first and second axles respectively, each of said first and second side gears comprising a helical face gear, a helical pinion having a helix angle in the range of 25 to 80 degrees and rotatively mounted in said case and engaging said first and second side gears, the helix angle of said side gears corresponding to the helix angle of said pinion, the axis of rotation of said pinion intersecting the axes of said side gears.

6. In a differential for a vehicle which has a case which is adapted to rotatively receive an axle into either side thereof, the improvement comprising first and second helical face side gears, means rotatively mounting said side gears in the case, each side gear adapted to be rotatively connected to an axle, at least one helical pinion interposed between said first and second side gears, means rotatively mounting said at least one helical pinion, said at least one helical pinion being in rotative engagement with said first and second side gears.

7. A differential mechanism for a vehicle comprising a case, first and second axles extending into said case from respective sides thereof and being coaxial with each other, first and second side gears mounted in said case and being rotatively connected to said first and second axles respectively, each of said first and second side gears comprising a face gear, a pinion having teeth inclined relative to its axis at an angle in the range of 25 to 80 degrees and rotatively mounted in said case and engaging said first and second side gears, the angle of the teeth of said side gears corresponding to the angle of the teeth of said pinion, the axis of rotation of said pinion intersecting the axes of said axles, each said first and second face side gears having engagement with said pinion outside the efficient operating geometry of said side gears.

8. A differential mechanism for a vehicle comprising a case, first and second axles extending into said case from repsective sides thereof and being coaxial with each other, first and second side gears mounted in said case and being rotatively connected to said first and second axles respectively, each of said first and second side gears comprising a face gear, a pinion having teeth inclined relative to its axis and rotatively mounted in said case and engaging said first and second side gears, the angle of the teeth of said side gears corresponding to the angle of the teeth of said pinion, the axis of rotation of said pinion intersecting the axes of said axles, each said first and second face side gears having engagement with said pinion outside the efficient operating geometry of of said side gears.

References Cited by the Examiner
UNITED STATES PATENTS

| 1,248,687 | 12/1917 | Logue | 74—711 X |
| 1,487,073 | 3/1924 | Nogrady | 74—711 |
| 1,711,546 | 5/1929 | Scurlock | 74—711 |
| 1,719,803 | 7/1929 | Fickett | 74—711 |
| 1,988,183 | 1/1935 | Whitcomb | 74—711 |

DAVID J. WILLIAMOWSKY, *Primary Examiner.*

DON A. WAITE, *Examiner.*

J. A. WONG, *Assistant Examiner.*